United States Patent [19]
Honeycutt et al.

[11] Patent Number: 5,661,217
[45] Date of Patent: Aug. 26, 1997

[54] METHOD OF MANUFACTURING MONOLITHIC STRUCTURES FROM POLYVINYL ALCOHOL

[75] Inventors: Travis W. Honeycutt, Ganesville; Bryan Khamvongsa, Lawrenceville; Baosheng Lee, Duluth, all of Ga.

[73] Assignee: Isolyser Company, Inc., Norcross, Ga.

[21] Appl. No.: 286,650

[22] Filed: Aug. 5, 1994

[51] Int. Cl.⁶ .................................................. C08L 29/04
[52] U.S. Cl. ........................... 525/62; 525/56; 524/803
[58] Field of Search ........................... 524/803; 525/56, 525/62

[56] References Cited

U.S. PATENT DOCUMENTS

| | | | |
|---|---|---|---|
| 2,340,866 | 2/1944 | Dangelmajer | 260/8 |
| 2,395,616 | 2/1946 | Dangelmajer | 260/36 |
| 2,408,377 | 10/1946 | Dangelmajer | 260/36 |
| 2,430,949 | 11/1947 | Porter et al. | 260/36 |
| 2,909,502 | 10/1959 | Matsumoto et al. | 260/45.5 |
| 3,089,493 | 5/1963 | Galindo | 128/283 |
| 3,314,809 | 4/1967 | Klug | 106/197 |
| 3,372,311 | 3/1968 | Lobur | 317/123 |
| 3,413,229 | 11/1968 | Bianco et al. | 252/90 |
| 3,484,874 | 12/1969 | Bickenheuser, Jr. | 4/112 |
| 3,578,619 | 5/1971 | Reeder | 260/22 |
| 3,607,812 | 9/1971 | Takigawa et al. | 260/29.6 B |
| 3,637,657 | 1/1972 | Morii et al. | 260/234 R |
| 3,762,454 | 10/1973 | Wilkins, Jr. | 150/1 |
| 3,790,067 | 2/1974 | Scheier | 229/55 |
| 3,859,125 | 1/1975 | Miller et al. | 117/155 UA |
| 3,865,918 | 2/1975 | Mitchell et al. | 264/188 |
| 3,886,112 | 5/1975 | Watson et al. | 260/33.4 |
| 3,886,610 | 6/1975 | Shelden | 5/81 R |
| 3,931,088 | 1/1976 | Sakurada et al. | 260/29.6 RB |
| 4,073,733 | 2/1978 | Yamauchi et al. | 210/500 M |
| 4,079,036 | 3/1978 | Ohmori et al. | 260/45.75 |
| 4,279,752 | 7/1981 | Sueoka et al. | 210/500.2 |
| 4,295,850 | 10/1981 | Haberli et al. | 8/524 |
| 4,343,133 | 8/1982 | Daniels et al. | 53/431 |
| 4,478,971 | 10/1984 | Ballard | 524/376 |
| 4,536,532 | 8/1985 | Miller et al. | 524/141 |
| 4,619,793 | 10/1986 | Lee | 264/2.6 |
| 4,620,999 | 11/1986 | Holmes | 428/35 |
| 4,651,725 | 3/1987 | Kifune et al. | 128/156 |
| 4,952,550 | 8/1990 | Wallach et al. | 502/404 |
| 4,959,341 | 9/1990 | Wallach | 502/404 |
| 4,959,464 | 9/1990 | Yeh | 536/114 |
| 5,051,222 | 9/1991 | Marten et al. | 264/143 |
| 5,106,890 | 4/1992 | Maruhashi et al. | 524/47 |
| 5,181,966 | 1/1993 | Honeycutt et al. | 134/42 |
| 5,181,967 | 1/1993 | Honeycutt | 134/42 |
| 5,183,571 | 2/1993 | Hanel et al. | 210/649 |
| 5,207,837 | 5/1993 | Honeycutt | 134/42 |
| 5,208,104 | 5/1993 | Ueda et al. | 428/364 |
| 5,225,120 | 7/1993 | Graiver et al. | 264/28 |

FOREIGN PATENT DOCUMENTS

| | | |
|---|---|---|
| 8902229 | 1/1990 | Brazil . |
| 0 010 171 B1 | 4/1980 | European Pat. Off. . |
| 0 050 288 A1 | 4/1982 | European Pat. Off. . |
| 0 107 576 A2 | 5/1984 | European Pat. Off. . |
| 0 176 316 A2 | 4/1986 | European Pat. Off. . |
| 0 272 816 A2 | 6/1988 | European Pat. Off. . |
| 15 19 530 | of 0000 | Germany . |
| 30 17 246 A1 | 11/1981 | Germany . |
| 47-41741 | 10/1972 | Japan . |
| 55-71532 | 5/1980 | Japan . |
| 59-100704 | 6/1984 | Japan . |
| 60-44897 | 3/1985 | Japan . |
| 61-159995 | 7/1986 | Japan . |
| 63-200764 | 8/1988 | Japan . |
| 2-68396 | 3/1990 | Japan . |
| 386161 | 1/1933 | United Kingdom . |
| 743165 | 1/1956 | United Kingdom . |
| 1187690 | 4/1970 | United Kingdom . |
| 1271424 | 4/1972 | United Kingdom . |
| 1312370 | 4/1973 | United Kingdom . |
| 1374199 | 11/1974 | United Kingdom . |
| 1451619 | 10/1976 | United Kingdom . |
| 2083762 | 3/1982 | United Kingdom . |
| 2102461 | 2/1983 | United Kingdom . |
| 2119709 | 11/1983 | United Kingdom . |
| 2211088 | 6/1989 | United Kingdom . |
| 2211196 | 6/1989 | United Kingdom . |
| 2227245 | 7/1990 | United Kingdom . |
| 2248842 | 4/1992 | United Kingdom . |
| WO80/01374 | 7/1980 | WIPO . |
| WO91/17210 | 11/1991 | WIPO . |

OTHER PUBLICATIONS

*Encyclopedia of Polymer Science & Engineering*; John Wiley & Sons; pp. 167–168, 170–172 & 186–187; 1989.

Primary Examiner—W. Robinson H. Clark

[57] ABSTRACT

A method of forming a useful molded part or film of polyvinyl alcohol. The polyvinyl alcohol, together with a plasticizer is injection or blow molded to form the useful molded part or melt processed (blown or cast extrusion) to form the film wherein upon forming the useful molded part or film, the plasticizer is substantially removed to create the useful molded part or film which is selectively hot water soluble and which is resistant to the affects of moisture below the solubility temperature.

13 Claims, No Drawings

METHOD OF MANUFACTURING MONOLITHIC STRUCTURES FROM POLYVINYL ALCOHOL

FIELD OF THE INVENTION

The present invention deals with selectively hot water soluble useful molded parts or films composed principally of polyvinyl alcohol. It has been found that such objects (molded parts or film) are significantly resistant to the effects of moisture below solubility temperatures if plasticizers used during processing are removed through the use of suitable solvents.

BACKGROUND OF THE INVENTION

Hospital patient care generates considerable quantities of infectious medical waste in primary and acute care facilities. There has been a general conversion from reusable, cleanable items, to disposable items over the last three decades. These conversions were made to promote antiseptic techniques in patient care and to decrease the potential for cross-infections between patients, staff and the general public. Recent federal and state government regulations such as the Medical Waste Tracking Act of 1988 and OSHA Medical Facility rules have resulted in a substantial increase in medical waste that must be classified as "infectious."

When a patient is admitted to a hospital, the patient produces approximately 55 pounds of medical waste per day. Approximately 20% of this waste is infectious. The current stated objective of the American Hospital Association and the Centers for Disease Control is to treat medical waste as soon as it is generated. Both organizations recognize that medical waste is primarily an occupational hazard for health care workers and not an environmental problem. The best way to deal with infectious medical waste is to disinfect it at the point of generation and dispose of the treated medical waste with minimum handling and storage on premises.

The need for an effective way to dispose of medical waste has been highlighted by the amendment made to 29 C.F.R. §1910.1030 which provides for the federal regulation under the Occupational Safety And Health Act, 29 U.S.C. 655, 657 to control bloodborne pathogens. Specifically, the Act calls for the establishment of an exposure control plan, the containment of specimens of blood or other potentially infectious materials and the general tightening of precautionary measures to minimize the spread of disease. A safe and effective way to dispose of hospital waste would greatly facilitate compliance with the above-referenced Act.

As a result, consumption of medical disposable woven or non-woven products has been growing at a rate of approximately 10% a year. In 1988, sales totaled approximately 341 Million Dollars. It is projected that by 1994, sales of medical disposable non-woven products will exceed 500 Million Dollars.

In the United States, there are approximately 30 million surgical procedures performed each year. After each surgical procedure, it is necessary that the operating theater be disinfected and sterilized before a new procedure is performed to minimize any exposure the patients may bring to other patients or staff. This is particularly important in light of today's increasingly stringent regulations regarding occupational exposure to blood and bodily fluids.

It has been determined that molded parts and film useful in health care facilities and which are subjected exposure by various bodily fluids and thus potentially containing pathogens and infectious materials can be conveniently disposed of by solubilizing such objects in a sterilizing medium. By doing so, burdens placed upon landfills are substantially reduced while health care facilities can dispose of potentially hazardous materials without having to treat them as such. It has been found that such selectively hot water soluble products can be composed of polyvinyl alcohol which can be configured into a wide variety of objects (molded parts or film) having desirable wear characteristics and yet are completely soluble in hot aqueous media.

Polyvinyl alcohol, as a material, has been known since the late 1920s, having been discovered in Germany and patented in 1929. Polyvinyl alcohol is somewhat unique among olefins because it has neither the hand nor the low melting point of other olefins such as polyethylene and polypropylene. Polyethylene and polypropylene have melting points in the 250°–275° F. range whereas polyvinyl alcohol has a melting point in excess of 400° F.

Polyvinyl alcohol differs from other olefins with respect to hand and shrink properties as polyvinyl alcohol has the hand of cotton and wool, whereas polyethylene and polypropylene have a slick, oily, greasy feeling. Polyvinyl alcohol also possesses the strength characteristics of condensation polymers such as polyesters, polyamides and polyamides. As such, high tenacity fibers can be formed from polyvinyl alcohol and are presently being manufactured commercially. Fibers composed of polyvinyl alcohol generally exhibit very high tensile strength. Water dissolution properties of various polyvinyl alcohols are also very well known.

Principally, polyvinyl alcohol is cold water soluble unless careful attention is paid to the molecular weight distribution, the degree of polymerization, residual sodium acetate, degree of hydrolysis and other contaminants in a particular resin batch. If these properties are very carefully controlled, a resin can be obtained which exhibits selective hot water solubility. However, if useful molded parts and film are to be configured from selective hot water soluble resins, the resins exhibit such a high melting point, that is, very near the degradation point of the resin, it is often not melt flow processable.

Hot melt processing of selective hot water soluble resins can be improved by adding to the polyvinyl alcohol resin, a suitable amount of a plasticizer. It is well known that glycols, glycerin and particularly the polyethylene glycols are excellent plasticizers for polyvinyl alcohol. Other materials are also good plasticizers such as water, sugars and similar materials.

It has been determined, however, that once polyvinyl alcohol has been plasticized, its barrier properties to water vapor and water liquid are virtually lost. For polyvinyl alcohol to be an effective water vapor barrier, that is, exhibiting low water vapor transmission rates and to be a liquid barrier, the resin must be extremely pure.

It is thus an object of the present invention to provide a method of processing polyvinyl alcohol resin such that it is capable of exhibiting adequate melt flow processing characteristics and yet exhibit effective water vapor barrier properties.

These and further objects of the present invention will be further appreciated when considering the following disclosure and appended claims.

SUMMARY OF THE INVENTION

The present invention involves a method of forming a useful molded part or film comprised of polyvinyl alcohol which is characterized as being soluble only at temperatures above 70° C. The polyvinyl alcohol useful herein is characterized as having a degree of polymerization between approximately 1000-2000 while being produced from at least 99% saponified polyvinyl acetate and having less than approximately 1/10% residual sodium acetate by weight.

The present method comprises injection or blow molding of polyvinyl alcohol with a plasticizer to create a suitable useful molded part or melt processing (blown extrusion or cast extrusion) of polyvinyl alcohol with a plasticizer to form a film. Upon forming the useful molded part or film, the plasticizer is substantially removed to the extent that the useful molded part or film contains no more than approximately 3% by weight of the plasticizer based upon the weight of the polyvinyl alcohol contained therein. The molded part can be heat annealed and the film can be heat annealed and stretched by post drawing. The degree of crystallinity for the heat annealed and stretched film is at least 0.7; the degree of crystallinity for the heat annealed molded part is at least 0.5. The degree of crystallinity, measured by IR spectroscopy, is defined as the ratio of crystalline area to amorphous area.

DETAILED DESCRIPTION OF THE INVENTION

As previously noted, once a polyvinyl alcohol resin has been plasticized, its barrier properties to water vapor and standing water are virtually lost. For polyvinyl alcohol to be an effective water vapor barrier, that is, to have low water vapor transmission rates and to exhibit the properties of an adequate liquid barrier, the polyvinyl alcohol resin must be virtually pure. As such, it is a principal goal of the present invention to provide the addition of a plasticizer to enable the polyvinyl alcohol resin to be melt flow processable but to remove the plasticizer after melt processing has been completed. At that time, the molded part can be heat annealed, and the film can be heat annealed and stretched by post drawing to create sufficient crystallinity to provide for a molded part or film which is selectively hot water soluble only above 70° C. The degree of crystallinity for the heat annealed and stretched film is at least 0.7; the degree of crystallinity for the heat annealed molded part is at least 0.5.

Ideally, suitable polyvinyl alcohol resins for use herein should exhibit a degree of polymerization between approximately 1000-2000 with hydrolysis in excess of 99% and residual sodium acetate of less than 1/10%. This material can then be dried to remove water and methyl alcohol and mixed with a suitable amount of plasticizer, for example, approximately 10-40% by weight glycerin. The polyvinyl alcohol-glycerin composition can then easily be injection or blow molded into a useful molded part or melt processed into a film. A film of polyvinyl alcohol can be made from a process selected from the group consisting of blow extrusion and cast extrusion, both methods being well known to those with ordinary skill in this art.

It has been noted that unless the plasticizer has been removed, a molded part containing, for example, approximately 20-40% by weight of a plasticizer such as glycerin, when exposed to water, will be soluble in cold water or if not soluble in cold water, will exhibit such poor properties in warm water as to be useless in making configured molded parts which are intended to be exposed to aqueous-based media such as blood and other human bodily fluids. Polyvinyl alcohol products containing considerable amounts of plasticizer will, upon confronting aqueous based media, exhibit a slimy feel and will exhibit the tendency to elongate.

As noted, polyvinyl alcohol-based products produced pursuant to the present invention should contain little or no plasticizer after heat-based fabrication techniques have been carried out. This is accomplished by washing a suitable object, whether it is a film, utensil or otherwise with a suitable solvent such as methyl alcohol in order to extract plasticizer from the polyvinyl alcohol-based object. Other suitable solvents include low molecular weight alkanes, hydrocarbons, cyclic hydrocarbons and heterocyclic hydrocarbons. For example, a basin comprised of polyvinyl alcohol weighing 200 grams can be washed with methyl alcohol to remove 80 grams of plasticizer such as glycerin. The washed basin can then be heat annealed to provide a product with sufficiently high crystallinity such that the basin will not provide a slimy feel or elongate and yet will be selectively hot water soluble only above approximately 70° C.

A number of useful products can be produced either directly or through first forming a suitable film and/or molded parts. Such useful products can be selected from the group consisting of utensils, packaging, drapes, covers, overwraps, gowns, head covers, face masks, shoe covers, CSR wraps, tapes, underpads, diapers and sheets.

EXAMPLE 1

A ChrisCraft polyvinyl alcohol film was extracted with methanol at 40° C. for 30 minutes to remove glycerin which was employed as a plasticizer for the polyvinyl alcohol. Upon removal of the glycerin, the film was heat treated at 80° C. for 5 minutes. The crystallinity of the film was improved from 18% to 23%. The water vapor transmission rate was reduced from 2.5 to 1.05 mg/cm$^2$-hr. The weight loss due to extraction was measured to be 21%.

EXAMPLE 2

Melt blown Andmar polyvinyl alcohol film was produced employing a glycerin plasticizer. The glycerin was extracted from the polyvinyl alcohol body at 40° C. for 30 minutes and the film further heat treated at 80° C. for 5 minutes. The crystallinity of the film was improved from 22% to 32%. The measured water vapor transmission rate was reduced from 1.6 to 0.8 mg/cm$^2$-hr while the weight loss of the film due to extraction of the glycerin was measured at 12%,

EXAMPLE 3

A polyvinyl alcohol film containing 80% Evanol 71-30, 20% PEG E400 was extracted with methanol at 40° C. for 30 minutes to remove the PEG E400 plasticizer. The film was then heat treated at 80° C. for 5 minutes. The crystallinity of the film was improved from 14% to 26%. The water vapor transmission rate was reduced from 1.6 to 0.9 mg/cm$^2$-hr. The weight loss due to extraction was measured at 18%.

EXAMPLE 4

A polyvinyl alcohol film was created containing 75% ethanol 71-30 and 25% PEG E400. The PEG E400 plasticizer was extracted with methanol at 40° C. for 30 minutes to remove the plasticizer and the film further treated at 80° C. for 5 minutes. The crystallinity of the film was improved from 32% to 41% while the water vapor transmission rate was reduced from 1.75 to 0.95 mg/cm$^2$-hr. The weight loss due to extraction was measured at 23%,

EXAMPLE 5

A polyvinyl alcohol film containing 70% Elvanol 71-30 and 30% 1,4 butanediol was extracted with methanol at 40° C. for 30 minutes to remove the 1,4 butanediol plasticizer.

The film was then heat treated at 80° C. for 5 minutes. The crystallinity of the film was improved from 31% to 38%. The water vapor transmission rate was reduced from 1.1 to 0.77 mg/cm²-hr while the weight loss due to extraction was measured at 29%.

What is claimed is:

1. A method of forming a molded part comprising a member selected from the group consisting of utensils and packaging of polyvinyl alcohol which is characterized as being water soluble only at temperatures above 70° C., said polyvinyl alcohol being further characterized as having a degree of polymerization between approximately 1000 to 2000, being produced from at least 99% saponified polyvinyl acetate and having less than approximately 1/10% residual sodium acetate by weight, said method comprising injection or blow molding said polyvinyl alcohol with a plasticizer to create said molded part whereupon forming said molded part said plasticizer is substantially removed to the extent that said molded part contains no more than approximately 3% by weight of said plasticizer, based upon the weight of said polyvinyl alcohol contained therein.

2. The method of claim 1 wherein said polyvinyl alcohol, after removal of said plasticizer, is crystallized by heat annealing resulting in a degree of crystallinity of approximately 0.5.

3. The method of claim 1 wherein said plasticizer is added to said polyvinyl alcohol in an amount of approximately 10–40% based upon the weight of said polyvinyl alcohol.

4. The method of claim 1 wherein said plasticizer comprises a member selected from the group consisting of glycerin and polyethylene glycol.

5. The method of claim 1 wherein said plasticizer is substantially removed from said polyvinyl alcohol by adding to said polyvinyl alcohol and plasticizer, a solvent for said plasticizer and subsequently removing said solvent and plasticizer from said polyvinyl alcohol.

6. The method of claim 5 wherein said solvent comprises methanol.

7. A method for forming a film configured into an article selected from the group consisting of packaging, drapes, covers, overwraps, gowns, head covers, face masks, shoe covers, CSR wraps, tapes, underpads and diapers comprised of polyvinyl alcohol which is characterized as being water soluble only at temperatures above 70° C., said polyvinyl being further characterized as having a degree of polymerization between approximately 1000–2000, being produced from at least approximately 99% saponified polyvinyl acetate and having less than approximately 1/10% residual sodium acetate by weight, said method comprising melt processing said polyvinyl alcohol with a plasticizer to form said film wherein upon forming said film, said plasticizer is substantially removed to the extent that said film contains no more than approximately 3% by weight of said plasticizer based upon the weight of said polyvinyl alcohol contained therein.

8. The method of claim 7 wherein said polyvinyl alcohol after removal of said plasticizer is crystallized by postdrawing or by heat annealing resulting in a degree of crystalllinity of approximately 0.7.

9. The method of claim 7 wherein said plasticizer is added to said polyvinyl alcohol in an amount approximately 10–40% based upon the weight of said polyvinyl alcohol.

10. The method of claim 7 wherein said plasticizer comprises a member selected from the group consisting of glycerin and polyethylene glycol.

11. The method of claim 1 wherein said plasticizer is substantially removed from said polyvinyl alcohol by adding to said polyvinyl alcohol and plasticizer, a solvent for said plasticizer and subsequently removing said solvent and plasticizer from said polyvinyl alcohol.

12. The method of claim 11 wherein said solvent comprises methanol.

13. The method of claim 7 wherein said film of polyvinyl alcohol is made from a process selected from the group consisting of blow extrusion and cast extrusion.

* * * * *